United States Patent [19]
Gerard et al.

[11] 3,917,926
[45] Nov. 4, 1975

[54] INTERFERENCE FRINGE COUNTING SYSTEM AND METHOD

[75] Inventors: Andre Gerard; Michel Lacombat, both of Paris, France

[73] Assignee: Thomson-CSF, Paris, France

[22] Filed: Jan. 20, 1970

[21] Appl. No.: 4,238

[30] Foreign Application Priority Data
Jan. 23, 1969 France .............................. 69.1182

[52] U.S. Cl. ........ 235/92 GC; 235/92 R; 235/92 PS; 235/92 EV; 356/106
[51] Int. Cl. ........ H04l 3/00; G06f 7/38; G06g 7/00
[58] Field of Search ......... 235/92, 66, 29 G, 60, 62, 235/64; 356/106

[56] References Cited
UNITED STATES PATENTS

| 2,604,004 | 7/1952 | Root ..................................... | 235/92 |
| 3,234,361 | 2/1966 | McLaren et al. ...................... | 235/92 |
| 3,449,743 | 6/1969 | Shepherd et al...................... | 235/92 |
| 3,500,022 | 3/1970 | Toscano............................... | 235/92 |

Primary Examiner—Daryl W. Cook
Assistant Examiner—Joseph M. Thesz, Jr.

[57] ABSTRACT

At least two phase shifted signals are obtained from electrical sensors as interference fringes pass over the sensors, so that the signals will vary as a function of the movement of the fringes in the interferometer; the signals are applied to n similar channels, for example two, where they are converted into positive and negative going pulses each time when the signals pass a threshold value, for example by a threshold circuit, a differentiator, and a polarity separating circuit such as back-to-back diodes; the pulses are then applied to a logic circuit having separate inputs for the two signals from each channel which decodes, from the sequence of the pulses, the number of fringes and the direction of passage of the fringes, to control a bi-directional counter (directly, or by setting a flip flop determining the direction of count). The threshold detector may be a trigger circuit changing state whenever a predetermined level is passed, so that minor vibrations and noise signals remain undetected.

8 Claims, 5 Drawing Figures

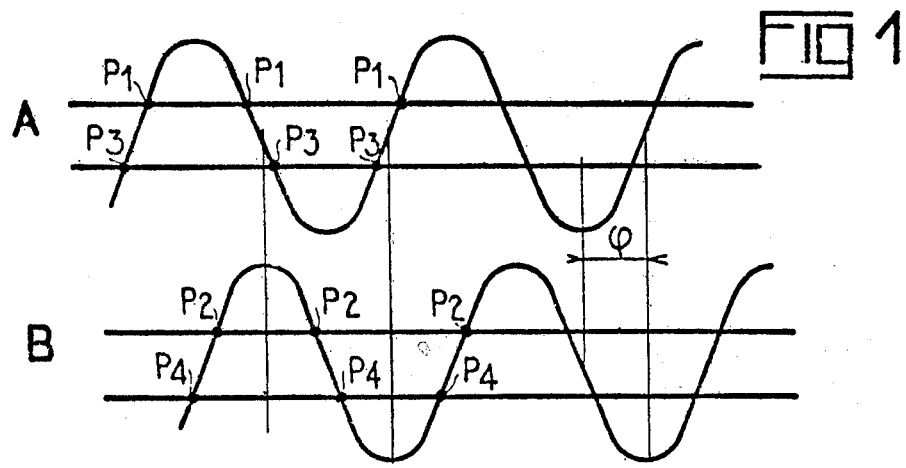
Fig 1
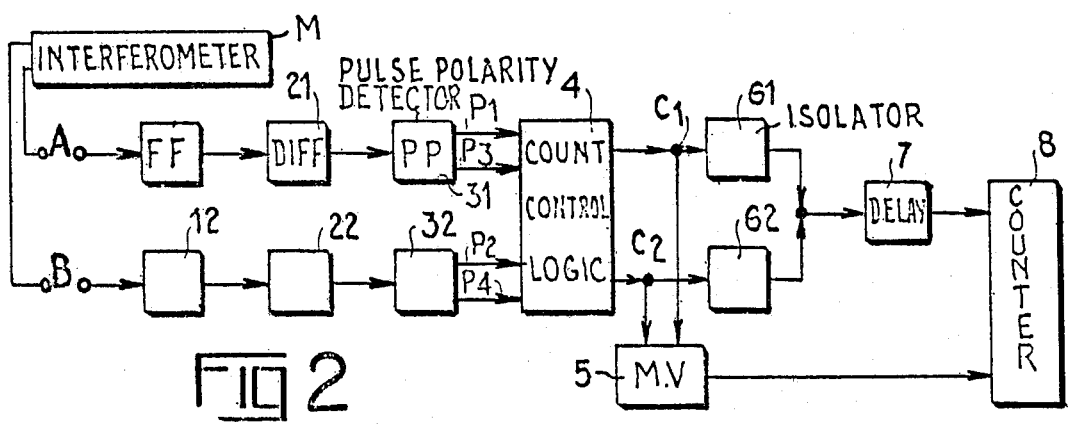
Fig 2
| R | S | C |
|---|---|---|
| $P_1$ | $P_2$<br>$P_4$<br>$P_3$ | $C_1$<br>$C_2$<br>0 |
| $P_2$ | $P_3$<br>$P_1$<br>$P_4$ | $C_1$<br>$C_2$<br>0 |
| $P_3$ | $P_4$<br>$P_2$<br>$P_1$ | $C_1$<br>$C_2$<br>0 |
| $P_4$ | $P_1$<br>$P_3$<br>$P_2$ | $C_1$<br>$C_2$<br>0 |
Fig 3

INTERFERENCE FRINGE COUNTING SYSTEM AND METHOD

The present invention relates to interferometers, and more particularly, to the system which counts the interference fringes passing electrical sensors as mechanical displacement of the moveable elements in the interferometer occur. More particularly, the present invention is concerned with the counting system, and method, in interferometers which are subject to mechanical disturbances, such as shocks, vibration, or the like, and which are so arranged that signals due to shocks or vibration will not cause a count of the counter, thus avoiding a response of the counter to parisitic vibrations or disturbances.

Interferometers are used to study optical spectra, and particularly to obtain directly a value representative of the waves of incident radiation. Interferometers are also used to obtain high precision lengths measurements.

Various systems to count the fringes obtained from interferometers have been proposed. For example, in the typical Michelson interferometer, a pair of optical-electrical sensing devices are so located that the variations in light intensity striking the sensors, as the fringes pass over the sensors, are in quadrature with respect to each other, so that not only the number of fringes, that is up, also the direction of passage of the fringes, that is up, or down, on the interferometer, can be detected. In order to obtain two output signals having a 90° phase shift with respect to each other, the two sensing devices may be shifted with respect to each other in the path of the bundle of light representative of the fringes in a plane perpendicular to the bundle of light and corresponding to a fourth of the period of recurrance of the fringes to be observed, that is, one-eighth of the wavelength of the light being utilized. Such a system is effective, but difficult to construct and keep aligned.

Other methods have been proposed, for example, to double the bundle of light received from the interferometer and to provide a phase shift between the fringes, of 90°, by known phase shifting devices, such as thin foils, optical grates or the like. In any event, the sense of the out-of-phase relationship, that is the advance or delay of one signal with respect to the other will be by a predetermined amount, preferably 90°, and will be a function of the direction of passage of the fringes received from the interferometer.

It has previously been proposed to electronically count signals received which are in quadrature with respect to each other, for example as described in "Journal of the Optical Society of America" of June, 1953, number 6, pages 507 and 508, where a counting circuit for interferometer fringes is described using two signals in quadrature with respect to each other. These signals are approximately sinusoidal and are derived from a pair of detectors. These signals are applied to circuits which contain bistable threshold flip flop circuits, such as Schmitt triggers. At a first threshold level, change over of the trigger circuit controls up, or down counting; at a second threshold level, very close to the first, the counting pulses themselves are supplied, in order to effect the up count, or down count of the counting circuit itself.

It has been found that circuits having two threshold levels causing the circuits to change, particularly when the levels are close together must have high frequency counting limits and cause errors due to parisitic signals, thermal noise and other disturbances which may have amplitudes several times in excess of the gap which separates the two threshold levels. The counters themselves change constantly from the counting up to the counting down state, although there are no pulses themselves to be counted, which introduces a delay in the actual operation of the counter when count pulses are being applied.

It is desirable to eliminate from these known circuits the requirement that the trigger circuits change state in response to two threshold levels, so that simpler circuits can be used which are responsive only to a single threshold level. This enables adequate separation, in time, of the changeover of the function from counting up to counting down of the counter itself, so that the counting speed to which the counter must respond can be matched to the speed of the actual change in counting as determined by the passage of the fringes before the sensing devices. Speed matching of the control of the counter, to count up or down, can be easily accomplished by use of a delay line, for example.

When controlling the counter to be effective only when pulses are to be counted, and not merely to change state to be in readiness to count up, or count down enables an increase in the counting precision by decreasing the distance, and thus the time between pulses. Increased accuracy can be obtained, in accordance with the present invention, by utilizing interlaced pulses of greater numbers than two and having a smaller phase separation than 90°.

Subject matter of the present invention: Briefly, the interferometer supplies electrical output signals which are phase shifted with respect to each other and vary as a function of movement of interference fringes in the interferometer. $n$ similar channels, each having one of the signals applied thereto, are provided. Each channel has a threshold circuit, such as a bistable trigger and responsive to supply an output pulse, in a positive-going or negative-going direction each time that the signal applied thereto passes a certain threshold level, either in an increasing, or decreasing direction. The pulses are differentiated and separated in polarity. The separated output pulses from each channel are applied to a logic network which decodes, from the sequence of the pulses, the number and direction of fringes passing the sensing devices in the interferometer and giving rise to the signals, the logic network providing an output to control a bi-directional counter to enter a count pulse if and only if the output signals from the channels indicate passage of fringes which is continuous; oscillatory motion of fringes detected by the sensing elements and occurring within the offset (giving rise to the phase differences) of the signals are detected in the logic network but do not result in output pulses. The counter may be bi-directional and have a positive going (up count) and negative going (down count) input, or may have a single count input and a control input determining, depending on the signal applied to the control input, the direction of count. Since the logic network will not provide any signals upon oscillation of the fringes between the sensing devices, the counter will remain in the state it was last placed, thus avoiding unnecessary changeover of counting circuitry, and decreasing the high frequency response requirements of the counter itself.

The invention will be described by way of example with reference to the accompanying drawings, wherein:

FIG. 1 is a schematic diagram of signals derived from the interferometer;

FIG. 2 is a schematic diagram of the interferometer, and the counting system associated therewith;

FIG. 3 is a logic table illustrating the logical transfer function of the count control logic of FIG. 2 in dependence on the inputs applied thereto;

Figure 4:
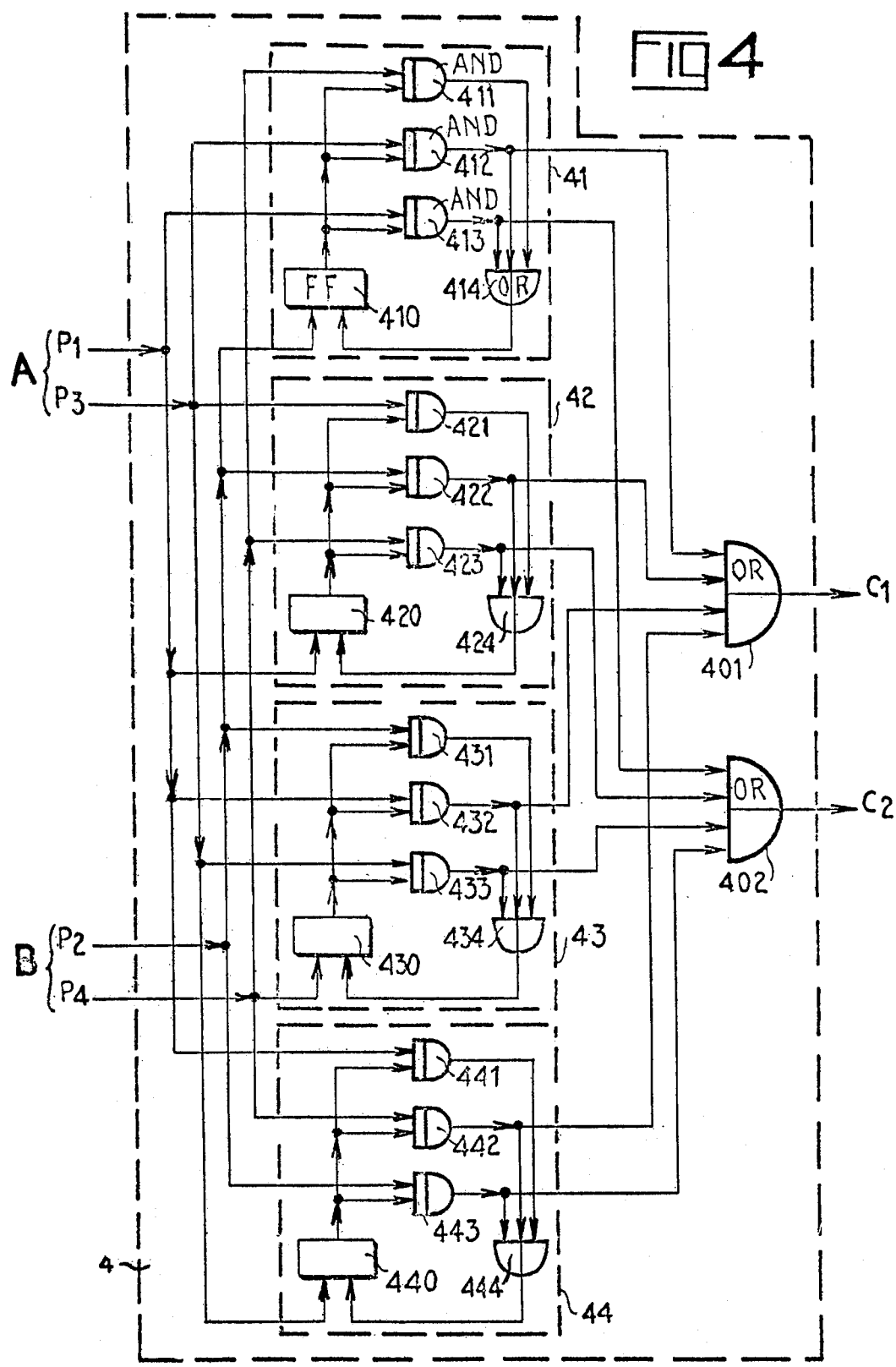
FIG. 4 is a schematic circuit diagram of a count control logic circuit having the transfer function of FIG. 3.

FIG. 1 shows two identical sinusoidal signals A, B, out of phase with respect to each other by a phase angle $\Phi$, which is in the case of two signals preferably 90°. These signals A, B are signals delivered by the respective optical-electric sensing devices in the inferometer and detecting two systems of fringes, as above explained. The two signals are represented as a function of time. Changing of the direction of movement, and thus of the direction of passage of the fringes before the sensing devices causes a change in the direction of the phase angle $\Phi$. In FIG. 1, signal A leads B by 90°; upon change of direction, the leading signal becomes the lagging signal, so that signal A will lag behind signal B.

Interferometer M, and only schematically shown since it, itself, can be any well known interferometer, applies the two signals A, B to two parallel and identical channels, as illustrated in FIG. 2.

The two channels receive as input the signals A, B and apply the signals to a Schmitt trigger 11, 12, then to a differentiating network 21, 22, a pulse polarity detector 31 (which may be, for example, formed by a pair of back-to-back coneccted diodes) and deliver outputs P1, P3 and P2, P4. Two outputs P1 and P3; and P2 and P4 of each one of the circuits 31, 32 are connected to corresponding inputs of a counter control logic circuit 4. Counter control logic circuit 4 has two outputs C1 and C2 which are connected to isolators 61, 62 on the one hand, and to separate inputs of a bistable flip flop or multivibrator circuit 5. The output for multivibrator 5 is connected to a counter 8 and controls the direction of count in counter 8, that is whether counter 8 is to count up, or down. The outputs from isolators 61, 62 are connected to a delay element 7, such as a monostable multivibrator, or delay line, and then, in turn, to the counting input of counter 8.

The signals A and B derived from the inferometer sensors are sinusoidal signals and, as noted, have a recurrence period corresponding to half of the wavelength of the light source. In order to have good interlace between the signals, the value of $\Phi$ of the phase shift therebetween is preferably chosen to be approximately 90°, that is to correspond to a quarter of the recurrent period of the signal. Successive measurements, equal approximately to one-eighth of the wave length of the light source, can thus be obtained.

The flip flops 11, 12 to which the signals A and B are applied change state each time when the threshold is passed; and then the differentiator circuits 21, 22 will provide positive output pulses P2 and P2 each time when the threshold is exceeded in an upward direction; the differentiators will provide negative pulses P3 and P4 each time when the threshold is passed in a decreasing direction. The pulse polarity detector circuits 31, 32 select the polarity of the pulses so that only positive pulses appear at terminals P1 and P2, and only negative pulses at terminals P3 and P4, for connection to logic circuit 4. Inverters, not shown on FIGS. 2 and 4, can be used to change the polarity of the pulses actually applied to the count control logic circuit 4, if this is a requirement of the circuit construction. Count control logic 4, in accordance with its own inherent logic table provides control for counter 8, controlling not only the direction, but also the number of counting in dependence on the sequence of pulses from its corresponding inputs P1, P2, P3, P4.

FIG. 3 illustrates the logical transfer function of the counter control logic unit 4. In FIG. 3, the first pulse which appears at the input to logic unit 4 is indicated in the column R; S indicates the second pulse which follows the pulse R. The column C indicates the output from logic circuit 4, that is whether an output appears at terminals C1 to control up count by one step, an output at terminal C2 to control a down count by one step, or the total absence of counts delivered by logic unit 4 and to be transmitted to counter 8.

The table of FIG. 3 has been established in conventional manner by first listing the high, or upgoing threshold detection by the Schmitt triggers 11, 12, and thereafter the negative going detections. If a pulse S immediately following an initial pulse R, indicates that it is an up-going, positive pulse, logic circuit 4 will deliver an up-count pulse C1. If the subsequent number on the other channel, is less, or indicative of a decreasing wave, then a down-count pulse C2 is provided. For the four pulses P1, P2, P3, P4, the down count for pulse P1 is pulse P4; inversly, the up count for pulse P4 will be P1 (last row of FIG. 3). No pulse control is applied to counter 8 from logic circuit 4 when two successive pulses come on the same channel.

The table of FIG. 3 further shows that, if P1 is the first pulse applied to logic 4, and the second pulse is P2, the up-count output C1 will have a pulse applied; inversly, if pulse P4 follows pulse P1, the down count output pulse C2 is applied. No pulse will be furnished if pulse P3 follows a pulse P1, as indicated by the zero notation in the third column of the table of FIG. 3.

The logic circuit 4 is illustrated in detail in FIG. 4, and provides the logical transfer function of the pulse sequence as illustrated in FIG. 3. Four identical sub-assemblies 41, 42, 43, 44 are arranged in parallel, each one having the four inputs and the two outputs applied thereto. One of the outputs is, each, connected to an OR gate 401, to provide the positive count pulse C1, the other being connected to a second OR gate 402, to provide the negative going output C2.

Considering only one of the sub-assemblies, that is sub-assembly 41, it will be seen that three AND gates 411, 412, 413 are provided, having pulses P1, P3 and P4 applied thereto (all of the same polarity; inverters, not shown, can be used where necessary). The second input to the AND gates is derived from a memory unit, which may be a bi-stable flip flop 410. The reset terminal of flip-flop 410 is derived from an OR gate 414, having the outputs from the AND gates 411, 412, 413 applied thereto. The outputs of AND gates 412, 413, are connected, respectively, to one of the inputs of OR gates 401, 402, respectively.

The three other sub-assemblies 42, 43, 44 have a similar structure to that of sub-assembly 41, with, however, different input connections to the AND gates, as seen in FIG. 4. The specific connections can readily be derived from the consideration of the transfer logic of the circuit.

If the first pulse applied to the input of the entire logic network of FIG. 4 is pulse P1, then the flip-flop 420 (in unit 42) will be set. Upon change of state of flip flop 420, gates 421, 422, 423 will be enabled. If the subsequent pulse is, for example, a pulse P2, then AND gate 422 will transmit the pulse to OR gate 401, to apply an up count pulse C1 to counter 8, so that counter 8 will step one count in a positive direction. At the same time, the pulse transmitted by AND gate 422, transferred over OR gate 424, resets the flip-flop 420. At the same time, that is as soon as the pulse from terminal P2 is applied to AND gate 422, it also sets flip-flop 410 in unit 41, thus enabling opening of the AND gates 411, 412, 413. If P4 is the pulse which follows P2, AND gate 411 will transmit the pulse to OR gate 414, to reset flip-flop 410 to zero; AND gate 411 is not, however, connected to one of the output OR gates, and thus no pulse will be supplied to the bi-directional counter 8. If, however, the pulse following pulse P2 is a P1 pulse, then the pulse is transmitted by AND gate 413 to OR gate 402, thus providing a negative going count from the bi-directional counter 8, that is a control at output C2 to step counter 8 by one step in a negative direction.

Each one of the sub-assemblies 41, 42, 43, 44 can be constructed by different networks, provided the logical transfer function of FIG. 3 is maintained with respect to a zero output upon a succession of two pulses subsequent to a pulse $P_i$ on the same channel of values $P_i \pm 2$.

Figure 5:
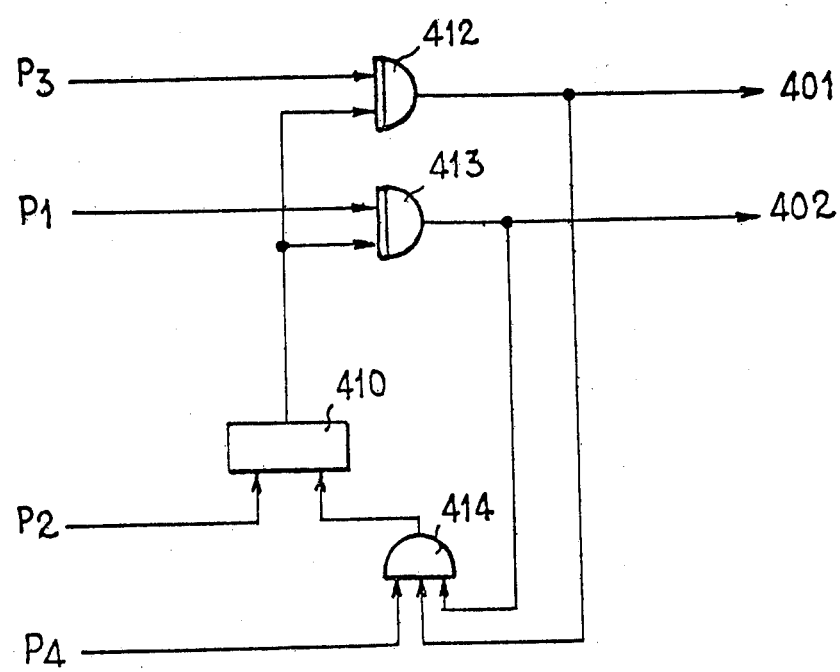
FIG. 5 is a fragmentary view of FIG. 4, illustrating a modification.

FIG. 5 illustrates a different embodiment of any one of the units, for example unit 41. AND gate 411 is not used and pulses P4 are directly applied to one of three inputs of OR gate 414'. The logical transfer function is the same.

Up counting pulses and down counting pulses C1, C2, respectively, are transmitted in the circuit of FIG. 2 to bi-stable flip-flop 5. If two pulses C1 succeed each other, there is no change of state of bi-stable flip flop and it will control counter 8 to remain in the up-counting position. Flip-flop 5 will change state only when a down counting pulse C2 is applied and will remain in that state until an up counting pulse C1 is again available. Simultaneously, pulses C1 and C2 are transmitted by the isolating network 61, 62 to a delay line 7, for application to counter 8. The delay introduced by circuit 7 permits control of the change-over of the direction of count in the counter 8 before the pulses to be counted actually arrive at the counter. Isolating circuits 61, 62, which may be buffers or OR gates, are provided to prevent feed-back of pulses through the network of flip-flop 5, which might cause counting errors.

The interferometer counting the pulses as described operates aperiodically, and does not require a reset to zero, since the first pulse from logic circuit 4 will set multivibrator 5 into one or the other state. If the counter 8 is of the type that it has bi-directional inputs, one each for up counting and one for down counting, then the multivibrator circuit 5 can be omitted, and pulses C1 and C2, respectively, can be directly applied to the up count and down count input terminals of the counter.

The apparatus of the present invention counts fringes and additionally detects the sense of movement, to obtain a measurement quantum which is much smaller than the actual recurrance periods of the output signals A and B. This is particularly desirable if external parameters are to be considered during the counting, for example when corrections are to be introduced, or counting steps are to be suppressed from time to time. The smaller the counting steps are, the easier it is to introduce corrections which will have significance.

More than two optic-electrical transducers can be used in the interferometer; for example, $n$ sensing elements, receiving $n$ systems of fringes and delivering $n$ interlaced, phase shifted signals, each phase shifted with respect to the next by $\pi/n$. The measurement steps can be still further decreased, the greater the number of steps for each wavelength, the greater the accuracy.

In order to count the fringes, and further detected sense of movement with even higher precision, $n$ channels, each equivalent to the two channels of FIG. 2 can be used, receiving the $n$ signals from the $n$ sensing devices; the outputs from the $n$ channels will then be applied to a logic circuit in a manner similar to that illustrated in FIG. 2.

The logic circuit to receive $n$ channels will have $2n$ sub-assemblies, each one similar to sub-asssemblies 41, 42, 43 and 44 as above described in connection with FIGS. 4, or 5. The two OR gates 401, 402 will then each have $2n$ separate inputs. It can be shown that only three of the $2n$ pulses applied to the input of the logic circuit can form a pulse S following immediately an initial pulse R. Thus, for an initial pulse $P_i$, the subsequent pulse may be either $P_{i+1}$, or $P_i \pm n$; $P_{i+n}$ is selected if $i$ is less than $n$; $P_{i-n}$ is selected if $i$ is greater than $n$. If $i$ is equal to $n$ the result is equivalent to the case when one has pulses $P_{2n}$. The above is valid when similar pulses are numbered similar to the numbering chosen for the case when $n$ is equal to 2, that is, in numbering in crossing order, positive pulses and then negative pulses. Other arrangements of numbering, and ordering pulses can be used, and different logical transfer tables can be derived for such different numberings, and different sequencing.

If $P_i$ is the initial pulse, and $P_{i+1}$ is the pulse which follows immediately, then logic network 4 will transmit a control pulse C1 in order to count up one step in counter 8. If, however, $P_{i-1}$ follows the pulse $P_i$, then a down-count step of counter 8 will be controlled by a pulse C2. No count pulse is transmitted to counter 8 if a pulse $P_i \pm n$ follows immediately a pulse $P_i$ on the same channel.

When utilizing a Michelson interferometer, the accuracy of measurement can thus be equal to the $4n^{th}$ of the wavelength of the light utilized.

Various changes and modifications may be made within the scope of the inventive concept; the specific circuits have not been shown since they, by themselves, are well known.

We claim:

1. Interferometer system having an interferometer (M) and a fringe counting system in which signals (A, B) are generated varying as a function of movement of interference fringes in the interferometer, the signals derived from the interferometer being phase shifted with respect to each other by a value of about $\pi/n$, in which $n$ is a whole number greater than one, comprising $n$ similar channels, each having one of said signals applied thereto and each including a threshold trigger circuit (11, 21), a differentiating network (21, 22) connected to said threshold trigger circuit, and pulse polarity detection means (31,32) passing pulses derived from said differentiating network in one direction only, and providing separate outputs (P1, P3; P2, P4) of positive, or negative polarity, respectively, said outputs being in pulse form whenever a predetermined threshold level is passed;

a logic circuit (4) having said separate outputs from said channels applied thereto and decoding the number of fringes and the direction of passage of fringes from the sequence of pulses from said outputs, said logic circuit having a positive going count output (C1) and a negative going count output (C2);

and a bi-directional counter circuit (61, 62; 8) connected to the outputs (C1, C2) of said logic circuit and counting forward or reverse, or not at all, in dependence of the distribution of pulses at the outputs of said logic circuit, the transfer function of said logic circuit being:

a. a positive count output (C1) if successive pulses of the same polarity appear sequentially at the separate outputs at different channels;

b. a negative count output (C2) if successive pulses of opposite polarity appear sequentially at the separate outputs of different channels; and c. no output pulses if successive pulses of opposite polarity appear sequentially at the separate outputs of any one channel.

2. Interferometer system according to claim 1 wherein the counter circuit (8) has a count input and a count direction control input; and count direction sensing circuit means (5) are connected to the output from said logic circuit and having its output applied to said count direction control input of said bi-directional counter circuit (8).

3. Interferometer system according to claim 2 including delay means (7) in the count signal path from said logic circuit to said counter (8).

4. Interferometer system according to claim 1 wherein a pair of channels are provided, said signals being out of phase by about 90°.

5. Interferometer system according to claim 1 wherein said logic circuit comprises 2n identical subcircuits (41, 42, 43, 44) connected in parallel, each one of said sub-circuits having four inputs and two outputs;

a pair of output OR gates (401, 402) one providing a positive going count output (C1) and the other a negative going count output (C2), one output of each of said sub-circuits being connected to a respective input of said output OR gates.

6. Interferometer system according to claim 5 wherein each one of the sub-circuits comprises three AND gates (411, 412, 413) having a pair of inputs, one input each being connected to one of the separate outputs from said threshold circuit means (P1, P2, P4);

a memory element (410);

an OR gate (414);

the remaining output from said threshold circuit means (P3) being applied to said memory circuit (410);

connection means interconnecting the outputs from said AND gates (411, 412, 413) to said OR gate (414) and interconnecting the output from said OR gate (414) to said memory element (410) to reset said memory element;

and interconnections from the outputs of two of said AND gates (412, 413) to said output OR gates (401, 402) providing said positive going count output and said negative going count output (C1, C2).

7. Interferometer system according to claim 5 wherein each of said identical subcircuits comprises two AND gates (412, 413) having a pair of inputs, one input each being connected to one of the separate outputs of a channel providing the separate outputs (P1, P3);

a memory element (410);

an OR gate (414');

the other outputs from said threshold circuit means (Ps, P4) being connected to said memory element (410) and to said OR gate (414') respectively, the output of said OR gate (414') being connected to reset said memory element (410);

connection means interconnecting the outputs from said AND gates (412, 413) to said OR gate (414');

and means interconnecting the output from said memory element (410) to enable said AND gates (412, 413) and interconnections from said AND gates (412, 413) to said output OR gates (401, 402) providing said positive going count output and said negative going count output (C1, C2; FIG. 5).

8. Method of analyzing the output of interferometers as interference fringes are detected by electrical detectors and signals derived from said detectors upon passage of said fringes, said method comprising the steps of amplitude selecting the signals with respect to a threshold level;

differentiating the amplitude selected signals;

polarity separating the differentiated signals to provide groups of pulses in positive and negative direction upon passage of signals through the threshold level, said groups being shifted in phase with respect to each other by $\pi/n$ in which $n$ is a whole number greater than one;

logically decoding the sequence of pulses and providing, selectively, output pulses indicative of positive, or negative counting directions, in whole numbers, or no pulse indicative of count number zero;

said logical decoding step including the steps of a. transmitting a positive count command (C1) if a pulse (R) of any polarity on any one channel is followed by a subsequent pulse of the same polarity on another channel.

b. transmitting a negative count command (C2) if a pulse (R) of any polarity on any one channel is followed by a subsequent pulse of opposite polarity on another channel; and c. transmitting no count command if a pulse (R) of any polarity on any one channel is followed by a subsequent pulse of opposite polarity on the same channel.

* * * * *